United States Patent [19]

Liebermann et al.

[11] 4,341,845
[45] Jul. 27, 1982

[54] HELICAL METALLIC RIBBON FOR CONTINUOUS EDGE WINDING APPLICATIONS

[75] Inventors: Howard H. Liebermann, Schenectady; Peter G. Frischmann, Scotia, both of N.Y.; George M. Rosenberry, Jr., Hendersonville, Tenn.

[73] Assignee: General Electric Company, Schenectady, N.Y.

[21] Appl. No.: 972,239

[22] Filed: Dec. 22, 1978

[51] Int. Cl.³ .................... B21C 37/00; B21F 3/00
[52] U.S. Cl. .................................. 428/592; 29/605; 164/423; 428/606
[58] Field of Search ................ 428/592, 606; 164/82, 164/423; 29/605

[56] References Cited

U.S. PATENT DOCUMENTS

| | | | |
|---|---|---|---|
| 449,036 | 3/1891 | Capek | 428/606 X |
| 2,457,616 | 12/1948 | Van Dyke et al. | 428/606 X |
| 2,825,108 | 3/1958 | Pond | 428/606 |
| 3,188,505 | 6/1965 | Wiley | 310/259 |
| 3,487,521 | 1/1970 | Clarke | 428/606 X |
| 3,674,084 | 7/1972 | Paliwoda | 164/271 |
| 3,856,513 | 12/1974 | Chen et al. | 164/423 X |
| 4,155,397 | 5/1979 | Honsinger et al. | 164/423 X |
| 4,187,441 | 2/1980 | Oney | 310/112 |
| 4,211,944 | 7/1980 | Haller | 310/72 |
| 4,211,957 | 7/1980 | Alley et al. | 315/276 |

OTHER PUBLICATIONS

Pond, Sr. et al., "Definition Limits of Splat Cooling", presented at Symposium Metallurgy and Applications of Rapid Solidification held at Battelle Seattle Research Center on Jun. 28-30, 1971.

Mobley: "Fundamentals of Melt Spinning", presented at Symposium Metallurgy and Applications of Rapid Solidification held at Battelle Seattle Research Center on Jun. 28-30, 1971.

Liebermann, H. H., "The Coaxial Jet Melt-Spinning of Glassy Alloy Ribbons", General Electric CRD Report No. 80CRD117, (1980).

Kavesh, S., "Principles of Fabrication", Ch. 2 in Metallic Glasses, Am. Soc. for Metals, (1978), pp. 36-73.

Pond, R., Jr. and R. Maddin, "A Method of Producing Rapidly Solidified Filamentary Castings", Trans. AIME, 245, 1969.

Chen, H. S., and C. E. Miller, "Centrifugal Spinning of Metallic Glass Filaments", Mat. Res. Bull., 11, 1976.

Liebermann, H. H., "The Dependence of the Geometry of Glassy Alloy Ribbons on the Chill Block Melt-Spinning Process Parameters", Materials Science and Engineering, 43, 1980.

Primary Examiner—Richard D. Lovering
Attorney, Agent, or Firm—Stephen S. Strunck; James C. Davis, Jr.; Leo I. MaLossi

[57] ABSTRACT

Metallic ribbon is provided in continuous helical form. The ribbon may be nested and/or manufactured with a continuous pattern of predetermined geometry in the inner and/or the outer edge as well as in the interior of the ribbon.

7 Claims, 10 Drawing Figures

HELICAL METALLIC RIBBON FOR CONTINUOUS EDGE WINDING APPLICATIONS

CROSS-REFERENCE TO RELATED APPLICATION

This invention is related to the invention disclosed and claimed in copending application Ser. No. 972,240, filed Dec. 22, 1978, in the names of the same inventive entity as the instant application, assigned to the same assignee as the instant application and entitled "Method of Making Helical Metallic Ribbon for Continuous Edge Winding Applications".

BACKGROUND OF THE INVENTION

1. Field of the Invention

This invention relates to metallic ribbons in helical form for continuous edge winding applications.

2. Description of the Prior Art

The fabrication of glassy alloy magnetic ribbon for use in electric motor applications is commonly believed to involve conventional punching operations performed on sheets or strips of the ribbon. However, a low filling or packing factor will result from conventional or prior art laminations of known glassy alloys because of the greater number of punchings required when compared with the number of punchings required when using prior art materials for laminations. This is because of the inherent limit on thickness in melt-quenched glassy alloy specimens. The overall effect is to increase the size and cost of the finished electric motor, thereby negating the savings offered by use of the glassy alloy material. A prior art method of making glassy alloy ribbon is to extrude the alloy in molten form through an appropriate orifice in a crucible and to subsequently impinge the melt jet onto the circumferential surface of a rapidly rotating substrate wheel. The melt jet axis is typically made to lie parallel to the plane of the substrate wheel. The ribbon so formed has the shape of conventional tape or ribbon and can be wound upon a spool.

It would be desirable to manufacture a motor stator comprising two concentric pieces of material. A center piece would be prefabricated with teeth and windings. The outer piece would be prefabricated or built in situ from an edge-wound strip in the form of a large helix.

Therefore, it is an object of this invention to provide metallic ribbon in a continuous helical form.

Another object of this invention is to provide a new and improved edge-wound glassy alloy magnetic ribbon in a helical form.

A further object of this invention is to provide edge-wound metallic or glassy alloy magnetic ribbon in a nested helical form.

A still further object of this invention is to provide edge-wound metallic or glassy alloy magnetic ribbon with prefabricated cutouts therein for making, as an example, a motor stator.

Other objects of this invention will, in part, be obvious and will, in part, appear hereinafter.

BRIEF DESCRIPTION OF THE INVENTION

In accordance with the teachings of this invention, there is provided a continuous length of edge-wound metallic ribbon having a helical shape, a substantially uniform cross-section and an axis normal to the plane of the helix. The ribbon has an inner peripheral edge and an outer peripheral edge as well as a pair of substantially parallel, opposed major surfaces. The composition of the ribbon may be that of a glassy alloy system which may be successfully produced by rapid quenching from the melt. Typical examples of such systems are Fe-B, Fe-B-C, Fe-B-Si, Fe-Ni-B, Cu-Zr and the like.

The ribbon may be formed in a manner whereby the helical coil is nested in such a fashion that the helix axis is not parallel to the local normal to the ribbon surface. Additionally, the ribbon may be formed in situ with predetermined geometrically shaped cutouts in the inner and/or outer edges of the ribbon. This form of cast ribbon is suitable for use in making appropriately designed electrical devices.

DESCRIPTION OF THE INVENTION

Figure 1:
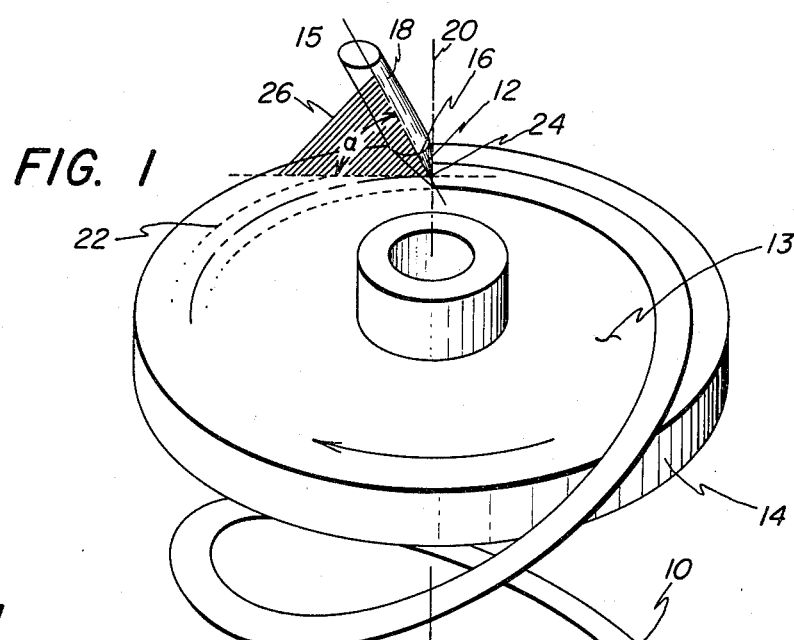
FIG. 1 is a schematic view illustrating fabrication of edge-wound metallic ribbon in a helical form.

Referring now to FIG. 1, there is shown a method of making edge-wound metallic ribbon 10. Within the limits of the present invention, a ribbon is a thin body whose transverse dimensions are very much smaller than its length. The ribbon 10 is formed by impinging a melt stream or jet 12 onto a moving substrate surface 13 of a substrate wheel 14, rotating about axis 20, by extrusion of the molten alloy through an appropriate orifice 16 of a crucible 18. The axis 15 of the melt stream or jet 12 is made to lie in a plane 26 defined by the tangent to the rotation of the substrate wheel 14 at the point of melt stream or jet axis 15 intersection 24 and by the normal to the local substrate surface 22 at the same point 24. Upon impingement of the melt stream or jet 12 onto the portion 22 of the moving substrate surface 13 of the wheel 14, the melt is chilled into the shape of the ribbon 10 which assumes an inplane curvature defined by the motion of the wheel at the area of impingement 24. The width of the ribbon formed at the melt stream or jet impingement area 24 determines the radius of the inner and outer peripheral edge Ri and Ro, respectively, of the edge-wound helical metallic ribbon 10.

The melt stream or jet axis 15 in the plane described may intersect the portion 22 of the moving substrate surface 13 at an angle $\alpha$ typically between 30° and 90°, with the range $40° \leq \alpha \leq 70°$ preferred for optimized ribbon geometric uniformity. The structure of the resulting metallic ribbon may be crystalline or glassy.

Glassy metallic ribbon may be made from a glassy alloy system by rapid quenching from the melt. Typical examples of glassy alloy systems are Fe-B, Fe-B-C, Fe-B-Si, Fe-Ni-B, Cu-Zr and the like.

It has been empirically found that the edge-wound ribbon most readily forms within certain limits of melt stream or jet velocity and substrate surface velocity. The preferred melt stream or jet velocity should range from about 1 m/s to about 10 m/s. The substrate surface speed preferably ranges from about 12 m/s to about 50 m/s. Precautions must be taken to assure intimate contact between the substrate surface and the cooling ribbon for a sufficient length of time in order to form a suitable helix. One particular method is to roughen the surface of the substrate wheel and thereby prolong ribbon dwell time on the surface of the wheel. Another method is to employ a gas or mechanical type of "holddown" device which is well known to those skilled in the art.

The ribbon as formed has a substantially uniform cross-section when compared with helical products fabricated by mechanical means of deformation such, for example, as by cambered rolling. The latter products typically have a tapered cross-section wherein the thickness of the ribbon is uniformly reduced towards the outer peripheral edge across the width of the ribbon.

Figure 1A:
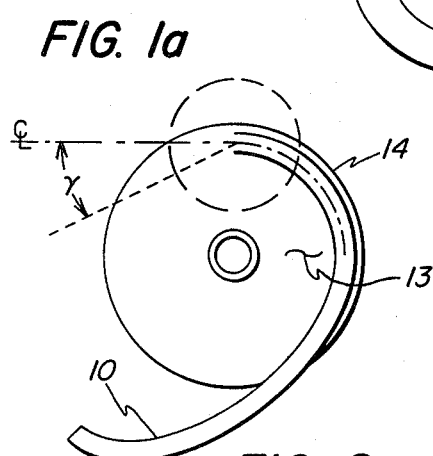
FIG. 1a is a top planar view of the schematic of FIG. 1 showing the azimuthal orientation of the melt flow axis in relation to the area of stream impingement on the moving substrate surface 22.

With reference to FIGS. 1 and 1a, the possible orientations of the crucible axis with respect to the moving substrate surface may be defined by an inverted cone with apex at the point of stream axis impingement. This cone is defined by the inclination and azimuthal angles $\alpha$ and $\gamma$, respectively. Using the projection $L^C$ as an arbitrary reference marker, the azimuthal angle may have values of $0 \leq |\gamma| \leq 180°$. "Backstreaming" occurs when $|\gamma| > 90°$, thereby resulting in ribbon 10 formed in the direction of substrate motion and in droplets or a continuous stream formed against the general direction of substrate motion, sometimes resulting in a continuous fiber.

Figure 2:
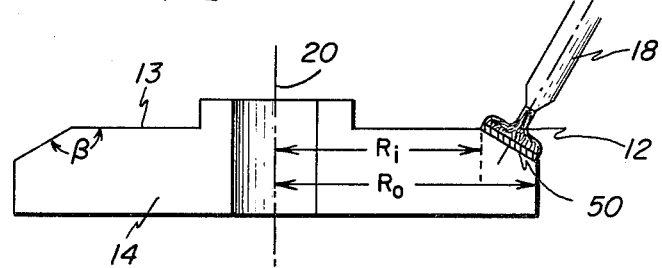
FIG. 2 is a partial cross-section schematic view of fabricating a nested edge-wound metallic ribbon in a helical form.
Figure 3:
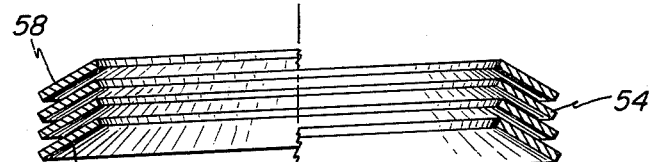
FIG. 3 is a partial cross-section side elevation view of a nested edge-wound metallic ribbon.

When the melt stream or jet 12 is made to impinge onto a beveled surface 50, that is, a portion of the substrate surface 13 which is modified by shaping it to be integral with and inclined to the remaining portion of the surface 13 of the rotating substrate wheel 14, an edge-wound helical metallic ribbon results and has a nesting angle somewhat less than that of the bevel inclination on the rotating substrate wheel 14. The surface 50 intersects the substrate surface 13 and forms the included obtuse angle $\beta$ therewith. For example, with reference to FIGS. 2 and 3, the melt jet 12 from crucible 18 is made to impinge upon the beveled surface 50 of the wheel 14 in plane 26 previously described.

The melt stream or jet 12, which is directed onto the moving substrate surface 50, has an axis 15 lying in plane 26 and inclined at $30° \leq \alpha \leq 90°$ with the surface 50. The plane 26 is defined by the tangent to the rotation of the substrate wheel 14 at the point of melt stream or jet axis 15 intersection 24 and by the normal to the local substrate surface 50 at the same point 24. The range $40° \leq \alpha \leq 90°$ is preferred for optimized ribbon geometry.

A nested glassy alloy ribbon 54 which is produced has parallel surfaces 56 and 58 inclined away from the central axis 20 of the helical coil.

Figure 4:
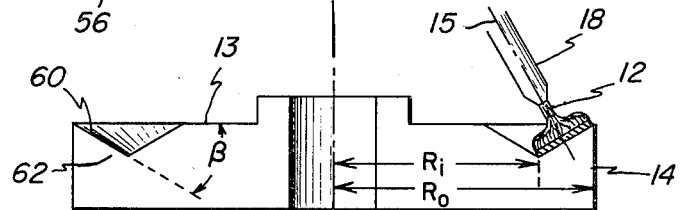
FIG. 4 is a partial cross-section schematic view of fabricating a nested edge-wound metallic ribbon in a helical form.
Figure 5:
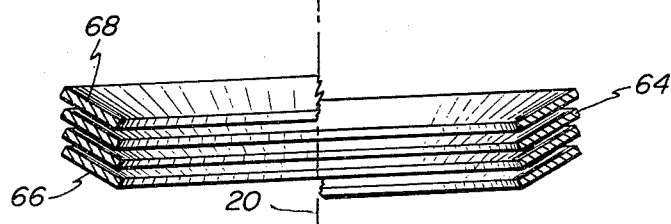
FIG. 5 is a partial cross-section side elevation view of a nested edge-wound metallic ribbon.

Alternately, as shown in FIGS. 4 and 5, the melt stream or jet 12 from crucible 18 is made to impinge on a beveled surface 60 formed in the outer portion 62 of the substrate surface 13 of the wheel 14. The surface 60 intersects an extension of the surface 13 of the wheel 14 and forms an included acute angle $\beta$ therewith. The melt stream or jet 12, which is directed onto the moving substrate surface 60, has an axis 15 lying in plane 26 and inclined at $30° \leq \alpha \leq 90°$ with the surface 60. The plane 26 is defined by the tangent to the rotation of the substrate wheel 14 at the point of melt stream or jet axis 15 intersection 24 and by the normal to the local substrate surface 60 at the same point 24. The range $40° \leq \alpha \leq 70°$ is preferred for optimized ribbon geometry. The nested metallic ribbon 64 which is produced has substantially parallel surfaces 66 and 68 which are inclined toward the central axis 20 of the helical coil.

Figure 6:
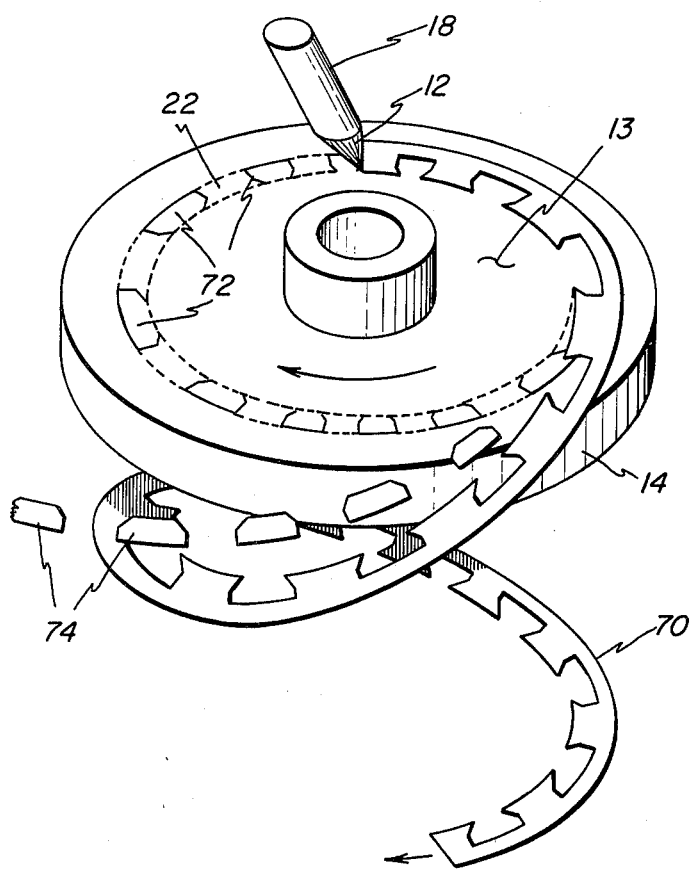
FIGS. 6, 7 and 8 are schematic views of fabricating an edge-wound metallic ribbon with a continuous pattern of predetermined periodic geometry in either one or both of the inner or the outer peripheral edges of the ribbon.

Referring to FIG. 6, the portion 22 of the moving substrate surface 13 on the rotating substrate wheel 14 may be modified in order to form a metallic ribbon 70 with predetermined cutout regions therein. The substrate surface portion 22 is modified by suitable means to contain barrier lines. For example, such lines may be introduced by scribing with a sharp-edged tool or by a silk screening ink application to produce a plurality of lines 72 which define the geometric configuration of the cutout to be made in the inner peripheral portion of the ribbon 70. The lines 72 provide a differential cooling rate between the molten metal cast on the lines 72 and the metal cast on the substrate surface portion 22. The lines 72 made either by the removal of material from the substrate surface portion 22 or by the application of ink provide a barrier which prevents the cast metal from cooling rapidly in the vicinity thereof. Therefore, the alloy cast as the result of the contact of the melt and the moving substrate surface portion 22 produces the metallic ribbon. Centrifugal force causes the ribbon 70 to be cast from the wheel after an adequate dwell time required to define the helical shape and causes the portion of the ribbon 70 enclosed by scribe marks to break or flake away and produce individual amorphous flakes or platelets 74. The ribbon 70 is suitable for many types of electromagnetic devices such as, for example, the rotor and stator portions of an electric motor, and applications requiring a pre-defined air gap such as in a ballast or in a linear reactor.

Figure 7:
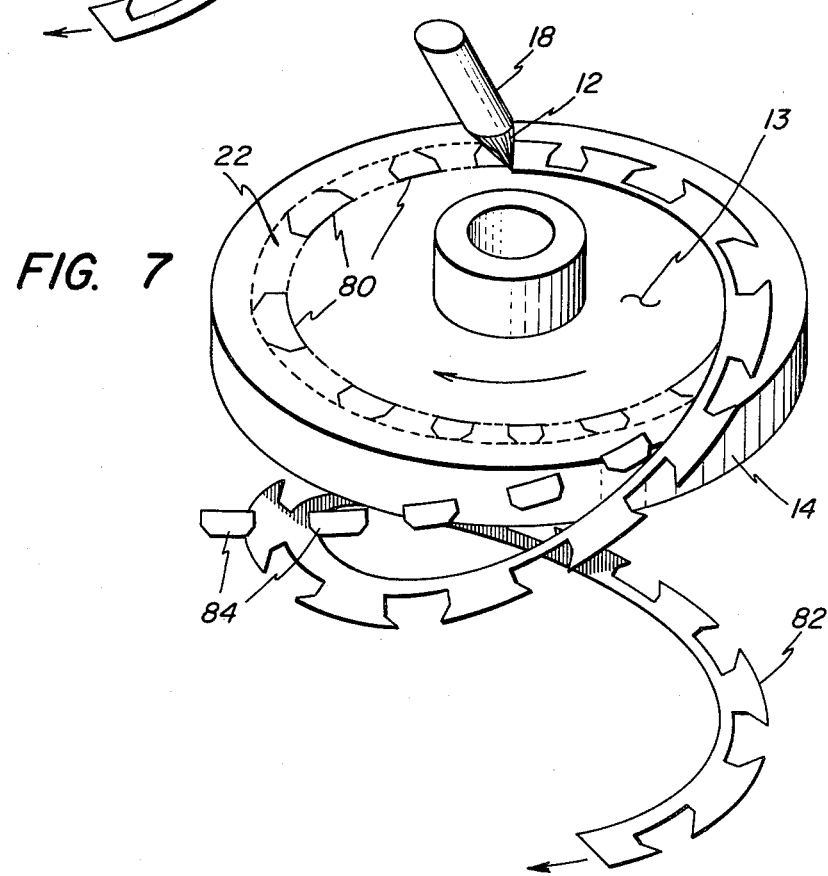

With reference to FIG. 7, there is shown another alternate embodiment of the ribbon 10. In this instance, lines 80 are made on the substrate surface portion 22 of the wheel 14 to form metallic ribbon 82 suitable for use in making the rotor portion of an electric motor. Again, metallic flakes 84 are a by-product. The cutouts are made in the outer peripheral portion of the ribbon 82.

The glassy alloy ribbons 70 and 82 may be employed in AC motors as stated heretofore. The ribbon 70 may be utilized in an AC motor stator for a squirrel cage induction or synchronous motor. The ribbon 82 is suitable for the direct casting of one or more components of an AC motor for squirrel cage induction, synchronous with or without amortisseur winding, or hysteresis motors as well as DC or universal motor parts.

Alternately, the barrier imposed by the scribe lines 72 and 80 may be obtained by employing a low thermal conducting, a non-thermal conducting, or a non-wetting medium to delineate the pattern of the flakes 74 and 84.

The flakes or platelets 74 and 84 may be employed in making composites or encapsulated shaped articles made from the flakes.

Figure 8:
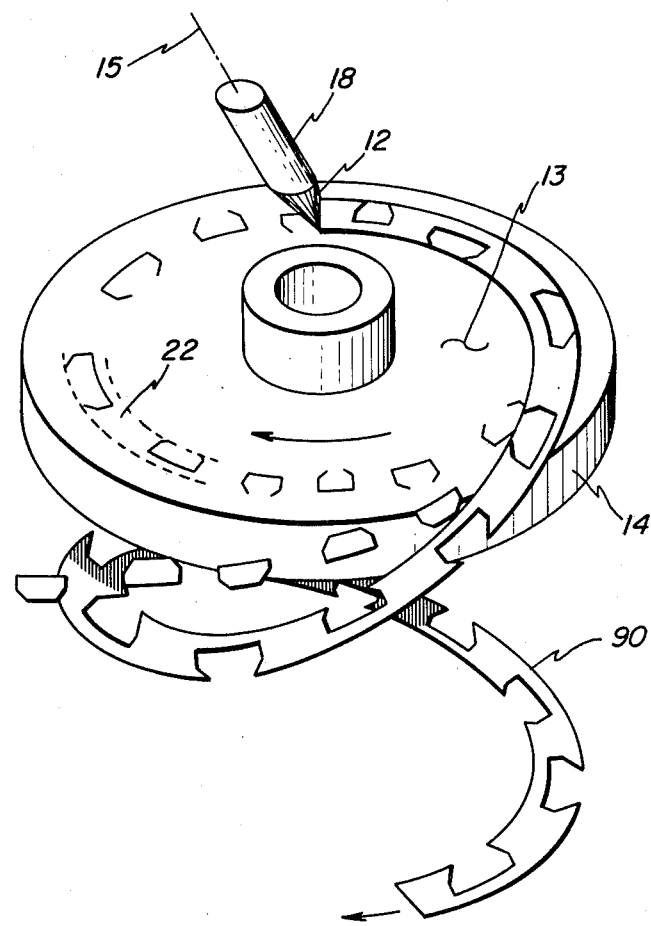

Referring now to FIG. 8, there is shown a ribbon 90 which embodies cutouts in both the inner and outer peripheral edges of ribbon 90. The ribbon 90 is manufactured in a process which embodies a process very similar to that required for producing ribbons 70 and 82. Metallic flakes are a by-product of the process.

The following Examples are illustrative of the teachings of this invention:

EXAMPLE I

The substrate was provided by the face of a 7.5 cm diameter OFHC copper wheel as shown in FIG. 1 finished with 400 grit emery paper and rotating at 8500 rpm. Angles $\alpha$ and $\gamma$ were set at 50° and 0°, respectively. The angle $\beta$ was 180°. The $Fe_{40}Ni_{40}B_{20}$ molten alloy jet was at 1200° C. and was formed by extrusion under 60 kPa Ar driving pressure through a 500 $\mu$m hole in a clear fused quartz crucible. The point of melt jet impingement was at a radius of 3 cm from the axis of the rotating wheel. The resultant product was a glassy alloy helix with average diameter 6 cm, ribbon width 0.9 mm, and ribbon thickness 38 $\mu$m, as measured by a micrometer.

EXAMPLE II

The substrate was provided by the face of a 7.5 cm diameter OFHC copper wheel as shown in FIG. 1 finished with 400 grit emery paper and rotating at a speed resulting in 35 m/s substrate surface speed at point of impingement. Angles $\alpha$ and $\gamma$ were set at 70° and 0°, respectively. The angle $\beta$ was 150°. The $Fe_{40}Ni_{40}B_{20}$ jet was formed by pressurization with 60 kPa Ar and extrusion of the melt through a 500 $\mu$m round orifice at 1200° C. The resulting helical glassy alloy ribbon sample had an average diameter equal to that of the wheel at the point of melt jet impingement. The nesting angle of the helix was some 10°–15° less than $\beta$.

Although the invention has been described relative to the employment of a free jet stream impinging upon the moving substrate surface to form a dynamic melt puddle from which ribbon is drawn, the apparatus of M. C. Narashimhan, appropriately modified, may be employed as well. The apparatus and process of using it is taught in Belgian Patent No. 859,694 issued Jan. 2, 1978. In the apparatus of M. C. Narashimhan, the molten alloy jet stream is kept confined to within a full breadth of the slit used in casting.

Figure 9:
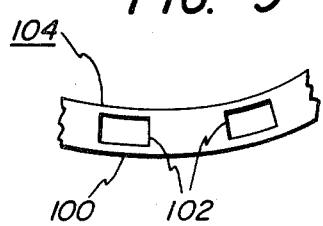
FIG. 9 is a schematic of a portion of ribbon illustrating a continuous geometric pattern within the ribbon.

The invention has been described with the possible embodiment of a continuous pattern of geometric cut-outs in either or both of the peripheral portions of the ribbon. However, a continuous pattern of a specific geometrical configuration may also be provided within the ribbon itself in order to meet motor performance standards. With reference to FIG. 9, there is shown a portion 100 of a ribbon 104 having walls 102 defining a cut-out in the ribbon which is part of a continuous pattern. The ribbon 104 is manufactured in the same manner as the previous ribbons and employing the same barrier line technique to obtain the continuous pattern. The cut-outs may be of any planar geometrical configuration and are determined by the required motor performance for which the ribbon is employed.

We claim as our invention:

1. A continuous length of cast edge-wound metallic ribbon having a helical shape, a pair of substantially parallel opposed major surfaces, an inner peripheral edge and an outer peripheral edge.

2. The cast edge-wound ribbon of claim 1 wherein the helical shaped ribbon is nested and the opposed major surfaces are inclined away from the longitudinal axis of the coil.

3. The cast edge-wound ribbon of claim 1 wherein the helical shaped ribbon is nested and the opposed major surfaces are inclined toward the longitudinal axis of the coil.

4. The cast edge-wound ribbon of claim 1 wherein the metallic ribbon has a glassy structure.

5. The cast edge-wound ribbon of claim 1 wherein the metallic ribbon is made of a glassy alloy selected from one of the glassy alloy systems in the group consisting of Fe-B, Fe-B-C, Fe-B-Si, Fe-Ni-B and Cu-Zr.

6. The cast edge-wound ribbon of claim 1 wherein the metallic ribbon has a partially crystalline and partially glassy microstructure.

7. The cast edge-wound ribbon of claim 1 wherein the metallic ribbon has a crystalline microstructure.

* * * * *